United States Patent [19]

Seach et al.

[11] 4,403,938
[45] Sep. 13, 1983

[54] PIPE SOCKET FORMING

[75] Inventors: Barry G. Seach, Castle Hills; Hans Muller, Seven Hills; Solomon E. Cohen, Eastwood, all of Australia

[73] Assignee: James Hardie & Coy. Pty. Limited, New South Wales, Australia

[21] Appl. No.: 20,545

[22] Filed: Mar. 14, 1979

[30] Foreign Application Priority Data

Mar. 20, 1978 [AU] Australia .................................. 3758

[51] Int. Cl.$^3$ .............................................. B29C 1/12
[52] U.S. Cl. .......................... 425/393; 425/DIG. 218
[58] Field of Search ....................... 425/393, DIG. 218

[56] References Cited

U.S. PATENT DOCUMENTS

| 3,728,059 | 4/1973 | Putter | 425/393 |
| 3,852,016 | 12/1974 | Delauzun | 425/393 |
| 3,861,847 | 1/1975 | Barnett | 425/393 |
| 4,065,243 | 12/1977 | Acda | 425/393 |
| 4,107,249 | 8/1978 | Murai | 425/393 |
| 4,157,372 | 6/1979 | Kyomen | 425/393 |
| 4,170,448 | 10/1979 | French | 425/393 |

Primary Examiner—James H. Derrington
Attorney, Agent, or Firm—Weingarten, Schurgin, Gagnebin & Hayes

[57] ABSTRACT

To ensure that a socket formed on a pipe-end in plastically deformable condition is in no part thinner than the pipe material out of which it is made, the pipe-end is first enlarged in diameter and encased within a contour die formed as envelope for the external shape required of the socket. The enlarged pipe-end is then longitudinally compressed to thicken it and internally formed so as to smooth the internal surface of the pipe-end and impose on it the internal shape and dimensions required of the socket. The required socket shape preferably includes a circumferential groove to house a resilient sealing ring.

4 Claims, 11 Drawing Figures

Fig.1

PIPE SOCKET FORMING

It is customary for pipes to be furnished with a spigot at one end and a socket at the other, it is also well known to provide pipe couplings with a socket at one end or at each end. In any case, each of these sockets is a circumferential enlargement able to receive within it the spigot end portion of another pipe. The term "pipe" as used hereinafter is intended to include pipes as such and pipe couplings.

The invention is particularly concerned with the formation of pipe sockets where the pipes are made of deformable material which is capable of being moulded or shaped plastically and then caused or allowed to cure or set to solid, rigid conditions; for example, such pipes as are made of asbestos cement which may be moulded in plastic condition and then cured or simply allowed to set, or pipes of polyvinylchloride (PVC) or other thermoplastic material, or of those thermo-setting materials, such as acid catalysed phenolic resins which have the property of being deformable before the final curing to irreversible rigidity. Although not confined thereto, the invention is particularly concerned with the formation of spigots on pipes of PVC and will be described herein largely in terms of a method and apparatus for forming sockets on PVC pipes.

In PVC pipes, both the spigot and the socket may be cylindrical with the socket sufficiently enlarged relative to the body of the pipe for the spigot of another similar pipe to enter it and be made leakproof therein by any suitable leakproofing medium. One common leakproofing expedient is for the pipe spigot to enter freely within a corresponding socket and the interior surface of the socket to be provided with a circumferential groove able to accommodate an O-ring or similar resilient sealing ring.

The present invention is not confined to spigot and socket arrangements shaped to include a circumferential groove for an O-ring or the like, but practical use of the invention is primarily intended in that connection, and therefore the following description is largely in terms of PVC pipes (as previously indicated) furnished with end sockets internally grooved to accommodate an O-ring or the like.

Hitherto, there have been two ways of forming internally grooved sockets in pipes of deformable material. One of these ways is known as the "Anger" method and the second employs apparatus known as a hydroformer.

With the Anger method, the heated PVC pipe is forced over a mandrel nose forming part of the machine and onto the body of the mandrel. A split external mould is clamped on the outside of the pipe; the interior of the split mould being contoured as the envelope of the required socket exterior. A first of "Fingers" is thrust radially outwardly from the mandrel to form the circumferential enlargement of the portion of the pipe to constitute the socket. In addition to this, a second set of similar fingers are thrust radially outwardly from the mandrel so to form the required circumferential groove.

This Anger method is open to objection in several respects. For example, the heated PVC pipe is not supported completely or cooled evenly by the two sets of fingers and this results in diametric unevenness in the socket, particularly in that part of it where the socket is grooved. Moreover, the enlargement of that portion of the pipe to constitute the socket necessarily causes a thinning of the socket wall which slightly but undesirably reduces the strength of the socket by comparison with the rest of the pipe.

Where a hydroformer is used, a fluid under pressure is employed inside the heated pipe to expand it within an external split mould. This not only forms the enlargement but also the circumferential groove in that enlargement. Although formation by use of a hydroformer gives close control over the external socket dimensions, it gives no direct control of the internal shape of the socket and like the Anger method, is prone to provide a socket of reduced wall thickness.

The object of the present invention is to overcome the indicated shortcomings by the provision of a method and apparatus by which pipe sockets may be formed so that the socket wall thickness is no less than that of the pipe body and may be greater than the pipe body thickness if desired, and in which both the external and internal surfaces of the socket are accurately shaped and dimensioned within any tolerances as may be required.

The invention provides a method of forming a socket in one end of a pipe in plastically deformable condition, comprising:
(a) forming the end portion of the pipe as a cylindrical enlargement of greater diameter than the remainder of the pipe,
(b) externally constraining said enlargement by enclosing it within a contour die formed as envelope to the external shape required of the socket,
(c) applying axially directed loadings to the ends of said enlargement thereby reducing the length of said enlargement and so preventing wall thickness reduction thereof; and,
(d) while said enlargement is externally constrained by said die, forming the surface required inside the socket.

The invention also provides apparatus for use in performing the method aforesaid.

An example of the apparatus is illustrated schematically in the drawings herewith.

Figure 1:
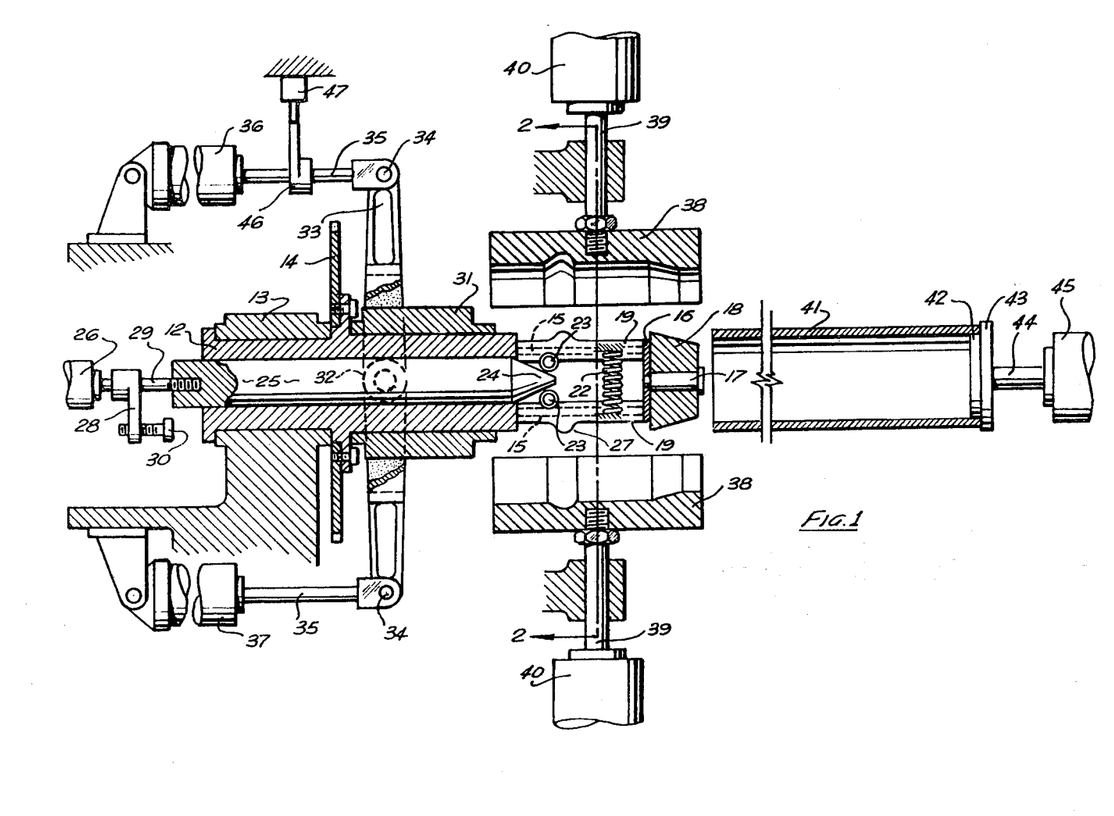
FIG. 1 is a side elevation indicating the general nature of the apparatus and showing the parts thereof prior to commencement of a socket forming operation.
Figure 2:
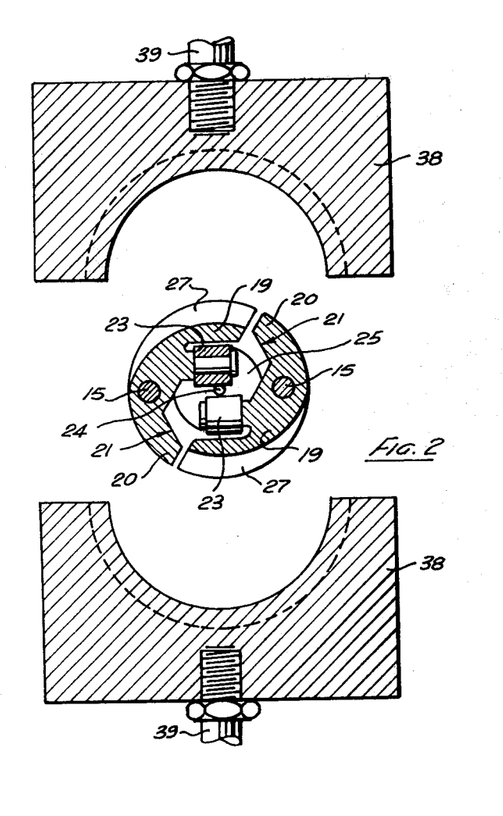
FIG. 2 is a sectional end view taken on line 2—2 in FIG. 1.

Referring to FIGS. 1 and 2, the apparatus comprises a carrier sleeve 12 rotatable in a bearing indicated at 13 and rotatable by means of a sprocket or other drive as indicated at 14. Two parallel pivot pins indicated at 15 are fixedly mounted on the sleeve 12 to project, as shown, from one end thereof. The outer ends of these pins are rigidly connected together by a plate or brace indicated at 16. This brace carries a cantilever pin 17 having mounted on it a frustro-conical nose-cone indicated at 18. The two pins 15 act as fulcra for a pair of trowelling levers 19. The levers 19 have tail-pieces 20 (see FIG. 2) furnished with abutment faces 21 between which a compression spring 22 is placed so that the levers 19 are at all times influenced to resume or remain in radially retracted condition (as shown in FIG. 2) relative to their pivot mountings 15. Each of the levers 19 carries a freely rotatable follower roller 23 and these two rollers, under the urging of spring 22, ride against the tapered end 24 of a cam shaft 25 which is longitudinally slidable and within the sleeve 12, and about which said sleeve is rotatable, thus to press the trowelling end portions of said levers into working contact with the internal surface of the socket being formed.

The cam shaft 25 is reciprocable within the sleeve 12 by operation of double-acting hydraulic cylinder 26 or otherwise. It will be seen that movement of cam shaft 25 rightwardly relative to sleeve 12 as shown in FIG. 1 will cause the follower rollers 23 and hence the groove-forming lobes 27 (of levers 19) to be thrust outwardly, and the amount of this out-spreading movement of the lobed portions of levers 19 is accurately controlled by an adjustable stop member 28 applied to the piston rod 29 of cylinder 26 so that the stop member is rotatable relative to the piston rod 29 but is fixed relative thereto insofar as longitudinal movement of said piston rod is concerned. The stop member 28 is furnished with a stop rod 30 which may be finely adjusted so to set the required limit of inward longitudinal movement of the cam shaft 25.

It will be seen that when sleeve 12 is rotated it will impart an orbital rotation to the two fulcrum pins 15, and by reason of this rotation the lobes 27 are similarly rotated so that the concurrent outward thrusting of those lobes (and the remainder of the working portions of the levers) and the orbital rotation thereof combine to effect the required circumferential trowelling action.

The rotatable sleeve 12 is surrounded by a non-rotatable loading sleeve 31. This loading sleeve has a pair of trunions 32 by which it is mounted in a yoke lever 33. The opposite ends of the yoke lever 33 are respectively pivotally connected at 34 to a pair of piston rods 35 in operative association with hydraulic compression cylinder 36 and ejection cylinder 37.

A pair of half-cylindrical contour dies 38, when brought together in cylindrical array, have their curved surfaces accurately shaped as the external envelope of the socket to be formed. The two contour dies are mounted on piston rods 39 when are operatively associated with contour die operation cylinders 40.

FIG. 1 shows a pipe consisting of body portion 41 (largely broken away) having its spigot end 42 mounted on a circular support 43. This support is mounted on a piston rod 44 operatively associated with hydraulic pipe-insertion cylinder 45.

The piston rod 35 associated with compression cylinder 36 preferably carries a striker 46 which is able to wipe against an adjustable over-run switch 47, the purpose of which will be described later herein.

When a PVC pipe such as 41 is required to have a preferably grooved socket formed on one end of it, its spigot end (42) iis first located on the support 43, with its piston retracted, and the pipe end to be socketed (appropriately heated to plasticity) is supported in axial coincidence with the nose cone 18; the two contour dies 38 and the loading sleeve 31 being retracted as shown in FIG. 1.

Figure 3:
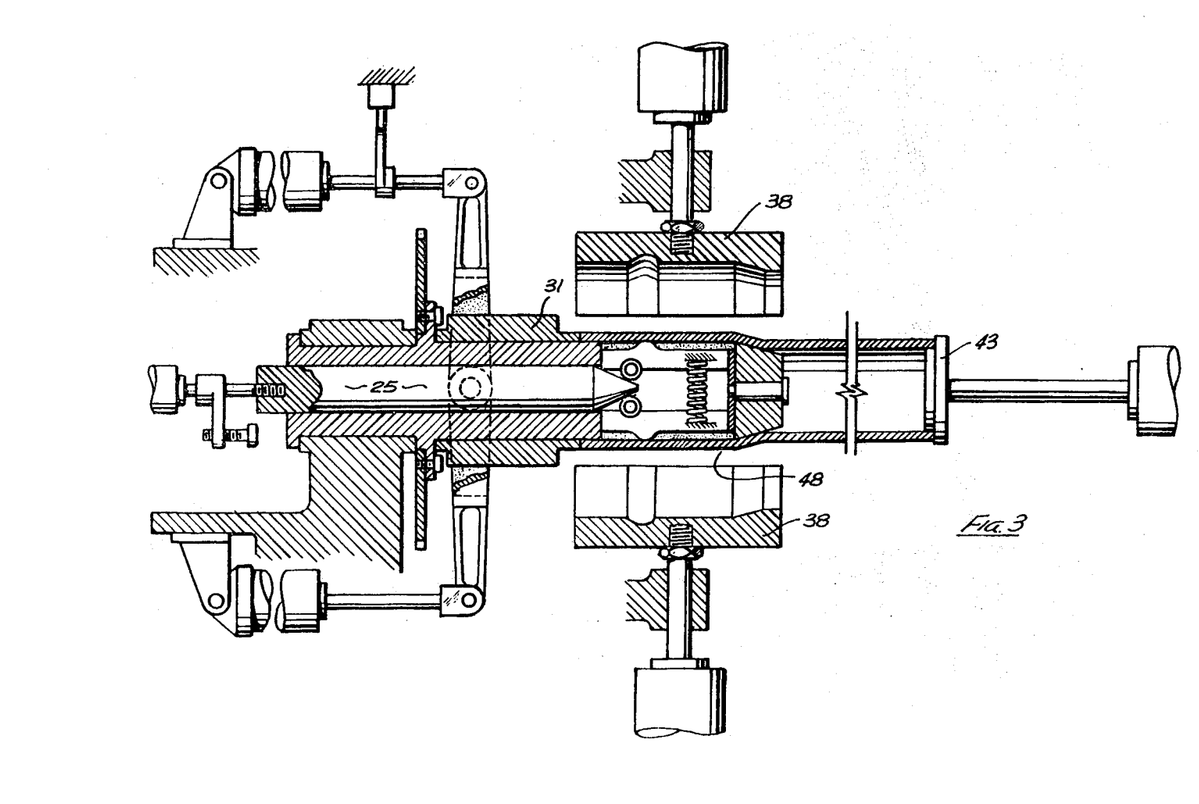
FIGS. 3, 4, 5, 7, 9 and 11 illustrate six sequential stages in the formation of a socket.

Piston rod 44 is then operated so that the pipe 41 mounts the nose cone 18 and thus the mounted end portion of the pipe acquires a cylindrical enlargement 48 as shown in FIG. 3. The contour dies 38 are then brought together (see FIG. 4) so that between them they then accurately define the required external shape of the socket to be formed. In this connection, the retracted loading sleeve 31 (see FIG. 4) acts as a stop able to halt the oncoming pipe accurately, with its socket cylinder 48 (FIG. 3) somewhat longer axially than the length required for the finished socket.

Figure 4:
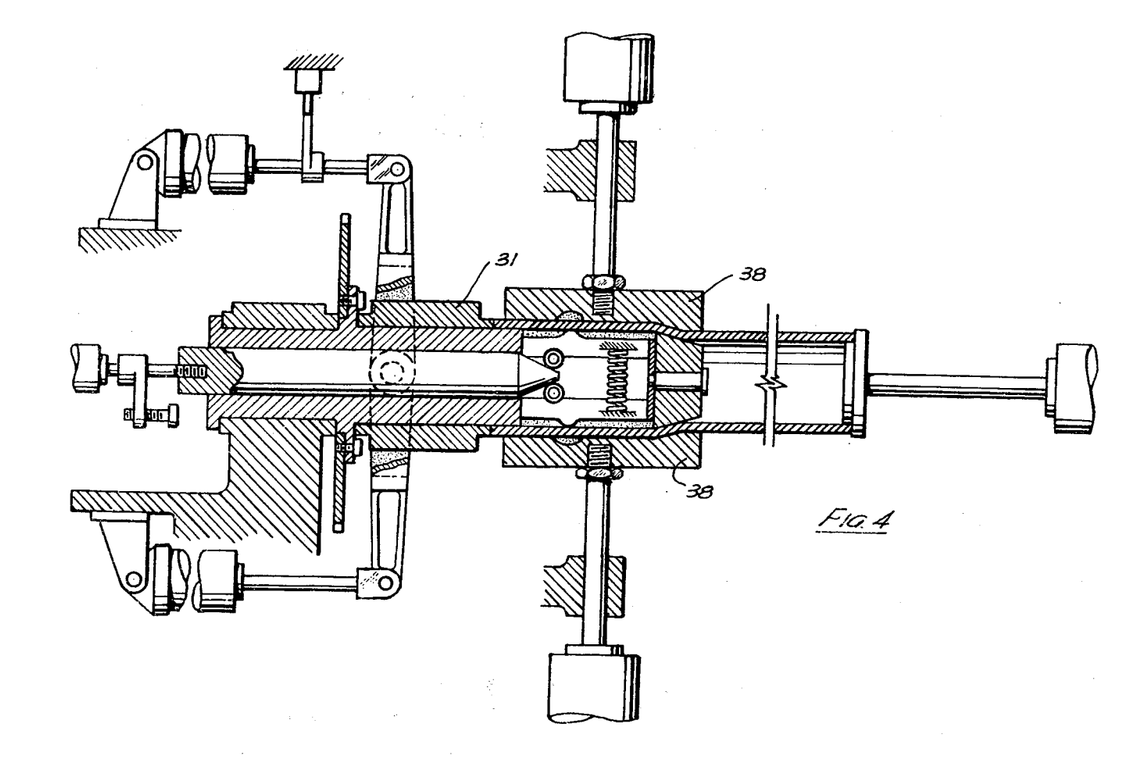

The oncoming motion of the pipe can, if desired, be detected by advancing sleeve 31 by operation of cylinder 36 and then allowing that cylinder to move freely, thereby the overrun switch 47 will be tripped when enough overrun movement is achieved as the pipe pushes sleeve 31 towards the left hand end of FIG. 4.

Figure 5:
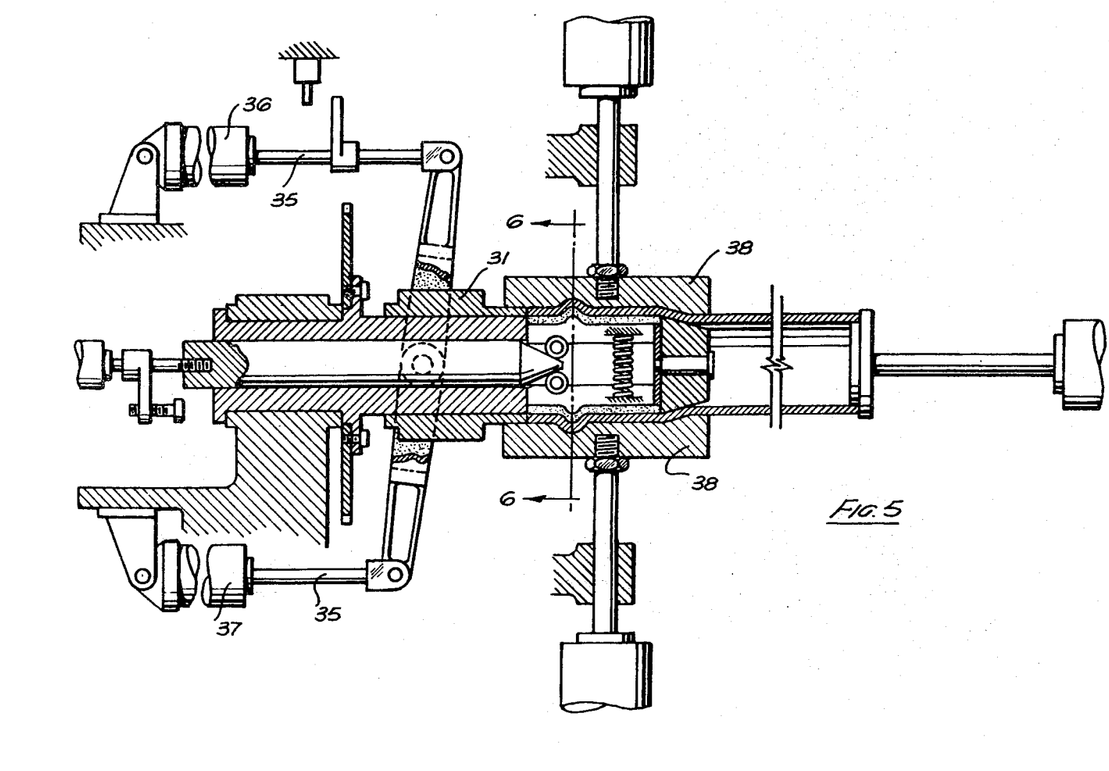

The compression cylinder 36 is then operated so that the loading sleeve 31 is advanced as shown in FIG. 5. This puts an axial loading on the pipe material enclosed between the contour dies 38 so as to thicken that material.

The hydraulic cylinder 26 is then operated so that the cam shaft 25 (see FIG. 7) is advanced to the extent permitted by the stop 30. This movement of the cam shaft 25 causes the follower rollers 23 to be thrust apart so that the smoothing surfaces of the trowelling levers, including the lobes 27, are thrust outwardly while they are rotating within the socket so to form the circumferentially grooved interior surface thereof with a rotary wiping or trowelling action, the accuracy of bore formation within the socket element being accurately governed by the adjustment applied to stop 30.

Figure 9:
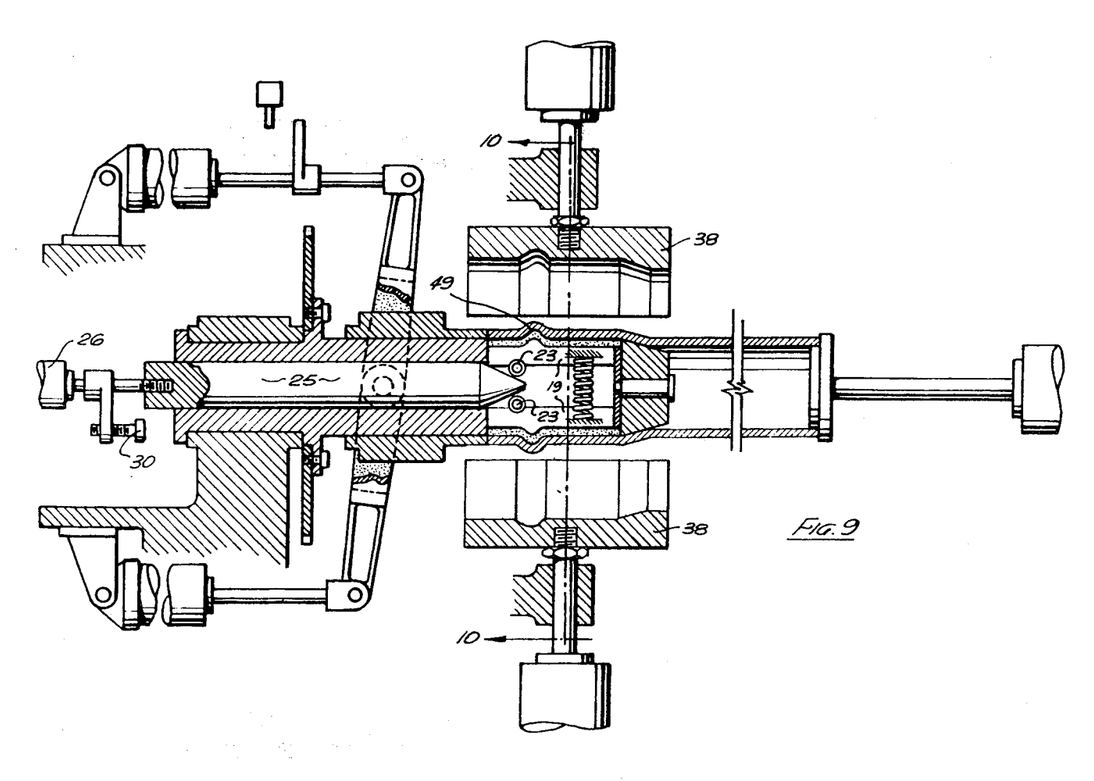
Figure 11:
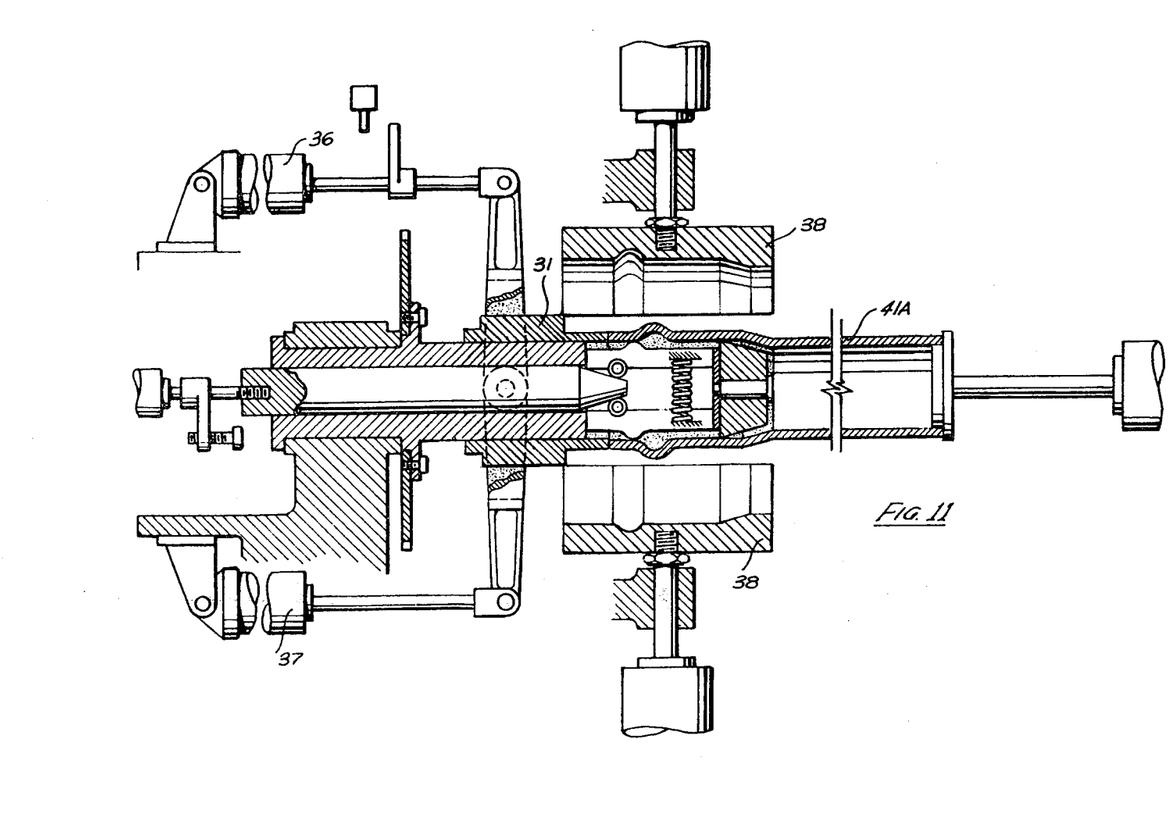

When the internal trowelling operation is finished (see FIG. 9) cylinder 26 is retracted so that the trowelling elements 19 are also retracted. This is followed by retraction of the contour dies 38 as shown in FIG. 9. The support 43 is then retracted and the loading sleeve 31 advanced by operation of ejection cylinder 37 so to initiate removal of the socketed pipe from the machine as shown in FIG. 11.

It will be understood that the socketed pipe may simply be allowed to cool to solidity. On the other hand, it may be quenched in water or means provided to stream cool air or other fluid onto it and/or through it at any convenient time during or following socket formation.

As already indicated, the figures of the drawings illustrate progressively occurring stages in forming a socket on one end of a pipe or a pipe coupling. Thus:

FIGS. 1 shows a pipe (41) and the machine parts are positioned at the commencement of socket formation.

Figure 6:
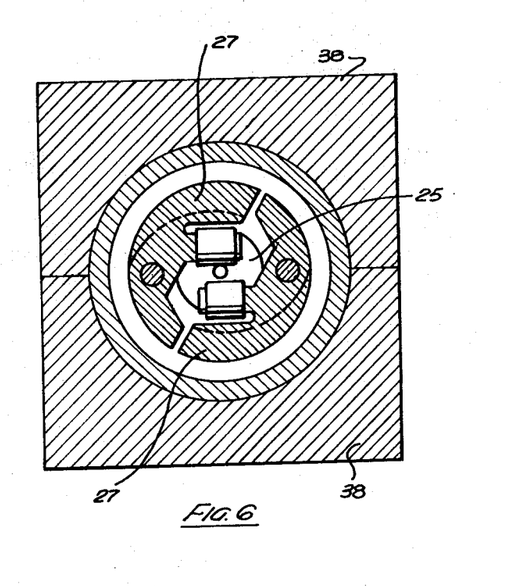
FIGS. 6, 8 and 10 are sectional end views taken respectively on lines 6—6, in FIG. 5., 8—8 in FIG. 7 and 10—10 in FIG. 9.

FIGS. 2 and 6 show cross sectional views of machine parts as indicated in FIG. 1.

FIG. 3 shows the enlarged socket cylinder 48, with contour dies 38, loading sleeve 31 and cam shaft 25 all fully retracted, and pipe support 43 fully advanced into the socket forming station.

FIG. 4 repeats FIG. 3 except for showing the contour dies 38 fully advanced enclosing the socket cylinder 48.

FIG. 5 repeats FIG. 4 to show the compression sleeve 31 partly advanced so to apply an axially directed compressive loading on the softened pipe-end under formation.

Figure 7:
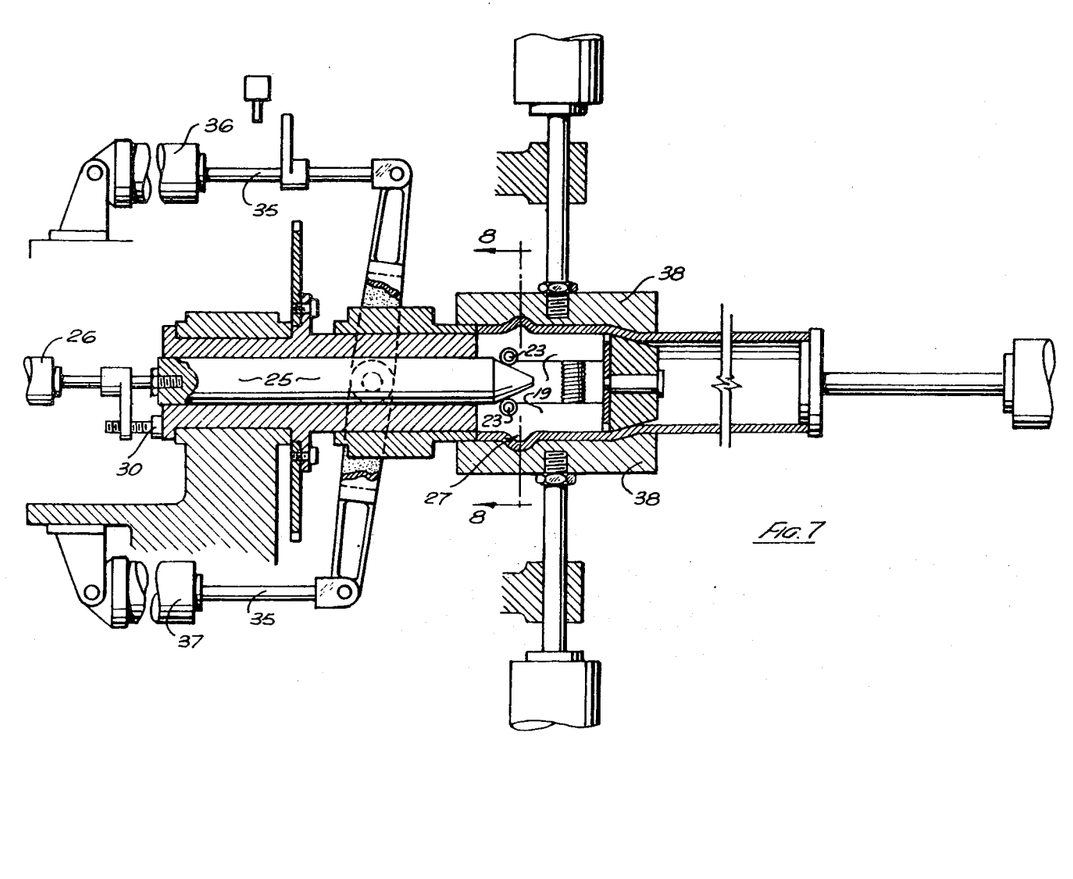
Figure 8:
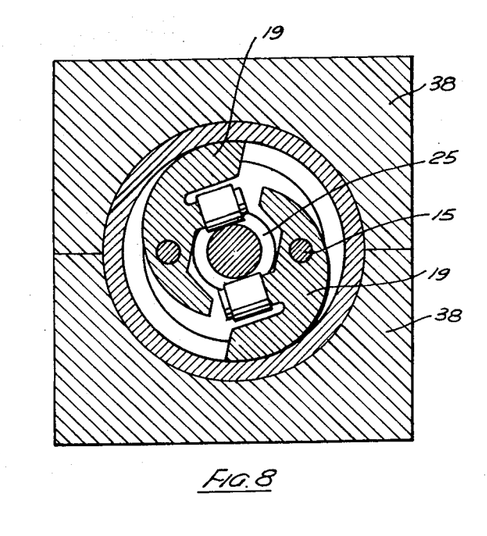

FIG. 7 repeats FIG. 5 except for showing (together with FIG. 8) cam-shaft 25 advanced so as to thrust the rotating trowelling levers 19 outwardly. In this connection (momentarily reverting to FIG. 5) it will be appreciated that when the compressive action is taking place there will be a tendency for the softened material under compression to crumple as its length becomes reduced. Any such crumpling outwardly is, of course, harmless and adequately restrained by the contour dies 38. Any inward crumpliing will be partly restrained by the mere presence of the trowelling levers, and insofar as it is not so restrained it will be smoothed away during the trowelling action; however, to diminish necessity for this smoothing action, trowelling may be commenced before endwise compression finishes.

Figure 10:
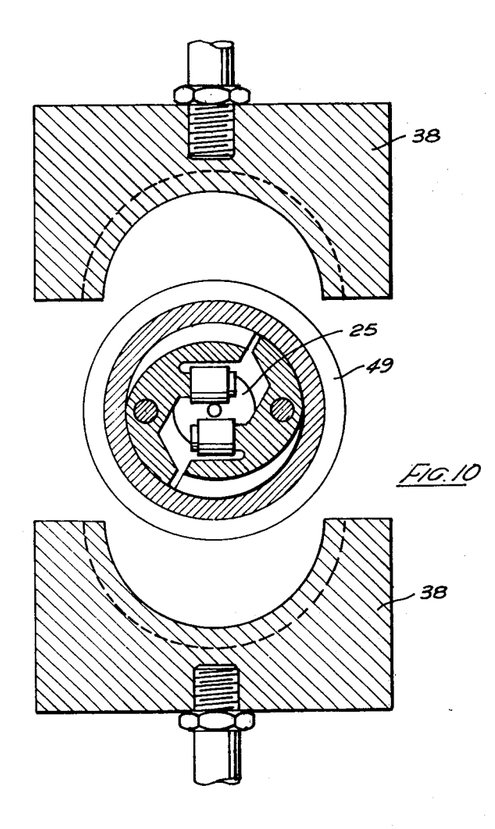

FIGS. 9 and 10 show the contour dies 38 and the cam-shaft 25 retracted following completion of the trowelling action and consequent smoothing formation of the socket interior including the rib 49 required to accommodate a sealing ring.

FIG. 11 shows the contour dies 38 retracted and sleeve 31 fully advanced, by operation of both cylinders 36 and 37, so to initiate removal of the fully socketed pipe 41A from the machine.

The illustrated embodiment of the invention is set forth by way of example. That embodiment could be varied extensively without departure from the essence of the invention.

For example, the cam shaft 25 instead of being conical at its camming end (24) could be wedge shaped so to provide two tapered flats for the follower rollers 23 to ride upon. In such case the cam shaft 25 would be freely rotatable and have a suitable thrust bearing provided at its outer end so that that part of piston rod 29 attached to shaft 25 will be free to rotate while the other part of piston rod 29 which extends into cylinder 26 is non-rotatable.

As further modification, the step of internally forming the socket may be effected by the trowelling action, as before, but without need for cam or wedge devices, by rotating the trowelling element at such speed as will suffice to exercise the necessary trowelling action by centrifugal out-thrusting of those elements.

In a still further modification, the trowelling elements are dispensed with and the interior of the socket enlargement merely by exerting fluid pressure inside said enlargement. This may be carried further by using a heating or cooling medium as the fluid so to assist in forming or consolidating the shape of the enlargement.

I claim:

1. Apparatus for forming a socket on an end portion of a pipe in a plastically deformable condition, said apparatus comprising:
   a contour die forming an envelope defining the external shape of said socket formed on said end portion of said pipe and adapted to encase said end portion of said pipe;
   means disposed at a position remote from said end portion of said pipe for supporting said pipe;
   a frusto-conical nose cone having an axis generally coincident with the axis of said pipe and being disposed adjacent an end of said contour die facing said supporting means, said nose cone having a diameter which increases moving in a direction axially away from an end thereof facing said supporting means;
   means for thrusting said end portion of said pipe axially toward said contour die to drive said end portion of said pipe into said contour die and concurrently to drive said end portion of said pipe over said nose cone to enlarge said end portion of said pipe;
   means for compressing said end portion of said pipe in an axial direction while said end portion of said pipe is disposed within said contour die;
   a carrier sleeve having an axis substantially coincident with the axis of said pipe and being rotatable about its axis within saiid contoured die;
   a plurality of levers, each lever being pivotally mounted to said carrier sleeve at a fulcrum, each of said levers having trowelling surfaces formed thereon;
   means for biasing each of said levers about its respective fulcrum to urge its trowelling surfaces away from interior surfaces of said end portion of said pipe; and
   cam means for pivoting each of said levers about its respective fulcrum to urge said trowelling surfaces formed on each of said levers radially outwardly and against interior surfaces of said end portion of said pipe during rotation of said carrier sleeve for circumferential wiping of said interior surfaces of said end portion of said pipe, and for radial shaping of said end portion of said pipe.

2. Apparatus for forming a socket on an end portion of a pipe in a plastically deformable condition, said apparatus comprising:
   a socket forming station including a contour die forming an envelope having the desired external shape of said socket formed on said end portion of saiid pipe, said contour die being adapted to encase said end portion of said pipe;
   means for concurrently enlarging the diameter of said end portion of said pipe and thrusting said end portion of said pipe into said socket forming station and into said envelope of said contour die;
   means for axially compressing said end portion of said pipe while said end portion of said pipe is encased in said contour die;
   a carrier sleeve disposed in said socket forming station and being rotatable about an axis generally parallel to the longitudinal axis of said pipe;
   a pair of levers disposed on said carrier sleeve and having trowelling surfaces formed thereon, each of said levers being pivotable about a fulcrum to position said trowelling surfaces in contact with interior surfaces of said end portion of said pipe;
   means for revolving said levers orbitally about said carrier sleeve axis within said end portion of said pipe; and
   cam means for driving said trowelling surfaces of said levers radially outwardly against interior surfaces of said end portion of said pipe during operation of said revolving means for circumferential wiping of said interior surfaces of said end portion of said pipe with a rotary trowelling motion and for application of radial pressure outwardly on said end portion of said pipe to expand and radially shape said end portion of said pipe.

3. The apparatus according to claim 2 further comprising:
   a tail portion formed on each of said levers at a location spaced from said lever fulcrum; and
   a spring associated with each of said tailpieces of each of said levers for biasing said trowelling surfaces thereof away from said interior surfaces of said pipe and towards trowelling surfaces on others of said levers.

4. The apparatus according to claim 2 wherein said cam means comprises:
   a cam shaft having an axis disposed generally parallel to the axis of said pipe, said cam shaft being disposed on a side of said forming station opposite of said pipe, said cam shaft having an end facing said forming station and being tapered in a direction toward said forming station;

follower rollers disposed on each of said levers and being adapted to ride along tapered surfaces of said end of said shaft; and means for advancing said cam shaft axially towards said forming station to drive said tapered surfaces of said end thereof against said follower rollers to urge said follower rollers radially outwardly away from said cam shaft to pivot each of said levers about its fulcrum and to drive said trowelling surfaces radially outwardly towards said interior surfaces of said pipe.

* * * * *